United States Patent Office 3,798,273
Patented Mar. 19, 1974

3,798,273
INTERMEDIATE FOR SYNTHESIS OF HOUSEFLY SEX ATTRACTANT
Robert L. Cargill, Columbia, S.C., assignor to Research Corporation, New York, N.Y.
No Drawing. Filed Nov. 29, 1972, Ser. No. 310,556
Int. Cl. C07c *49/20*
U.S. Cl. 260—593 R    3 Claims

ABSTRACT OF THE DISCLOSURE

The invention relates to compounds of the formula

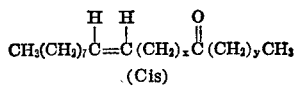
(Cis)

wherein $x$ is an integer from 7 to 11, inclusive, and $y$ is an integer from 0 to 4, inclusive, said ketone containing 23 carbon atoms which are useful in the synthesis of the housefly sex attractant of the formula

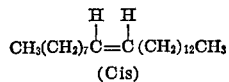
(Cis)

BACKGROUND OF THE INVENTION

The present invention relates to novel intermediates for the preparation of a housefly sex attractant useful as a bait material in traps, etc.

The isolation, structure-proof and a synthesis of the housefly (*Musca domestica* L.) sex attractant was recently reported by D. A. Carlson et al. (Science, Vol. 174, page 76 (1971)). The attractant or pheromone has been named z-9-tricosene and has the structural formula:

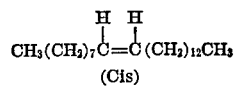
(Cis)

The material was synthesized from nonanal and the phosphorane derived from 1-bromotetradecane and triphenylphosphine. The following reaction scheme was employed to prepare the pheromone:

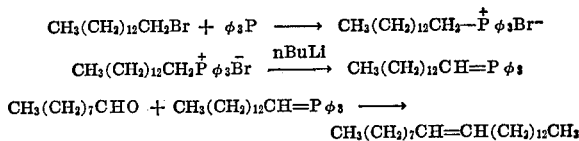

The yield of the pheromone based on the salt according to the above reaction scheme is about 73%. The hydrocarbon product obtained contains about 85% of the Z or cis isomer and 15% of the E or trans isomer. The E isomer does not mask the activity of the Z isomer; however, it is not an effective attractant.

SUMMARY OF THE INVENTION

The present invention is predicated on the discovery that the housefly sex attractant may be prepared in a simple manner from an intermediate derived from one of a variety of unsaturated fatty acids commonly occurring in vegetable oils. Fatty acids having the structural formula:

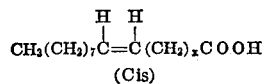
(Cis)

wherein $x$ is an integer from 7 to 11 inclusive may be reacted with an appropriate alkyl lithium to provide a novel $C_{23}$ ketone having the structural formula

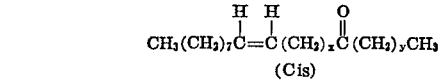
(Cis)

wherein $x$ is as described above and $y$ is an integer from 0 to 4 inclusive.

Reduction of this ketone provides the housefly pheromone. As is apparent, this method of synthesis is far simpler and more efficient than the above described presently employed prior art process for preparing the housefly sex attractant.

The synthesis is illustrated below by the conversion of erucic acid. It is to be understood, however, that any unsaturated fatty acid satisfying the above structural formula may be employed. The addition of two molar equivalents of methyl lithium to a solution of erucic acid in ether yields, after the usual workup and distillation, the novel 23 carbon atom ketone in 93% yield. Reduction of the ketone using the Huang-Minlon modification of the Wolff-Kishner reduction (J. Amer. Chem. Soc., Vol. 68, page 2487 (1946)) provides the pheromone in 89% yield. The synthesis may be easily carried out on a larger scale and the agents employed are readily available and relatively inexpensive. The following reaction scheme is exemplary of the process:

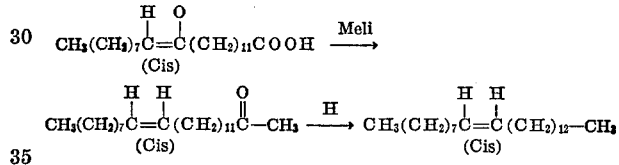

Similarly, oleic acid can be converted to a ketone according to the invention employing amyllithium. Reduction of the intermediate ketone provides the sex attractant in good yields. The following reaction scheme is illustrative of the conversion of oleic acid:

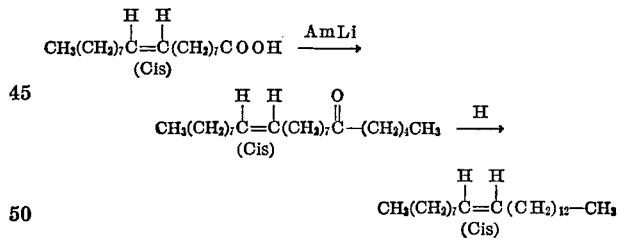

The invention is illustrated by the following non-limiting examples:

Example 1

To a 10.7 g. (31.3 mmol) quantiy of erucic acid in dry ether (200 ml.) containing o-phenanthroline (5 mg.) was added 31.5 ml. (63.0 mmol) of 2.00 M methyllithium in hexane, at a rate such that gas evolution was moderate. The reddish-brown reaction mixture was stirred for 30 min. and quenched by cautiously adding 10% NaOH (100 ml.), saturated NaHCO$_3$ (10 ml.) and saturated (NH$_4$)$_2$SO$_4$ (10 ml.). The phases were separated and the aqueous phase was extracted with ether (3×100 ml.). The combined organic phases were dried (MgSO$_4$), concentrated, and distilled to give 9.77 g. (93.3%) of ketone. BP 140° (0.10 mm.); $n_D^{23}$ 1.4572; IR (CCl$_4$) 3015 (vinyl C—H), 1725 cm.$^{-1}$ (C=O); NMR (CCl$_4$) δ 0.88–2.50 (m, 42H, all protons except vinyl; CH$_3$ *s* at δ 2.00), 5.27 [t, J (apparent) ≃4.5 Hz., 2H, vinyl]; mass spectrum (70 e.v.) showed M$^+$ at m/e 336; vpc (3% SE-30, 8' x ⅛", 250°, 50 ml./min.) showed one peak.

*Analysis.*—Calcd for $C_{23}H_{44}O$: C, 82.07; H, 13.18. Found: C, 82.04%; H, 13.30%.

The ketone was determined to have the following structural formula:

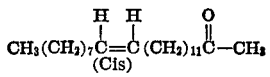

EXAMPLE 2

To a solution of 3.1 g. (47 mmol) of 85% KOH in diethylene glycol (30 ml.) was added 4.77 g. (14.1 mmol) of the ketone of Example 1 and 2.0 g. (40 mmol) of 85% hydrazine hydrate. The reaction mixture was heated at 140° until the water had been removed and then at 193° for 4 hours. The cooled reaction mixture was poured into ice-water (150 ml.), neutralized with 6 N HCl, and extracted with pentane (5×100 ml.). The combined extracts were dried ($MgSO_4$), concentrated and distilled to give 4.55 g. (88.8% of olefin B.P. 170–172° (0.5 mm.); $n_D^{23}$ 1.4532 [BP 157–158° (0.1 mm.); $n_D^{26}$ 1.4517];[1] IR ($CCl_4$) 3015 cm.$^{-1}$ (vinyl C—H); NMR ($CCl_4$) δ 0.67–2.25 (m., 44H, all protons except vinyl;

$$\underline{CH_2}-CH=CH-\underline{CH_2}$$

m, at δ 1.98), 5.25 [t, J (apparent) ≃4.5 Hz, 2H, vinyl]; mass spectrum (70 e.v.) showed M+ at m/e 322; vpc (3% SE–30, 8′ × ⅛″, 250°, 50 ml./min.) showed one peak.

*Analysis.*—Calcd for $C_{23}H_{46}$: C, 85.63; H, 14.37. Found: C, 85.75%; H, 14.30%.

The structural formula of the product was determined to be:

---

[1] Carlson et al., Science, Vol. 174, P. 76 (1971).

The preferred intermediates are those ketones derived from erucic acid and oleic acid having the respective structural formulae:

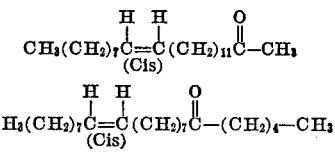

I claim:

1. A compound having the structural formula:

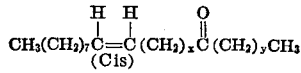

wherein $x$ is an integer from 7 to 11, inclusive, and $y$ is an integer from 0 to 4, inclusive, said ketone containing 23 carbon atoms.

2. The compound having the structural formula:

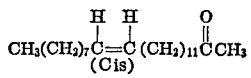

3. The compound having the structural formula:

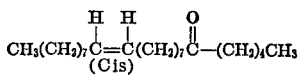

References Cited

Bowman, "J. Chem. Soc., 1952, pp. 3945–49.
David et al., "J. Chem. Soc.", 1949, pp. 1541–1549.

LEON ZITVER, Primary Examiner
J. H. REAMER, Assistant Examiner

U.S. Cl. X.R.
260—682